United States Patent Office 3,492,183
Patented Jan. 27, 1970

---

3,492,183
FIREPROOF COATING COMPOSITION
Hamilton L. J. Marshall, P.O. Box 961,
Mobile, Ala. 36601
No Drawing. Continuation-in-part of application Ser. No. 328,464, Dec. 6, 1963. This application Feb. 17, 1967, Ser. No. 616,767
Int. Cl. C09k 3/28
U.S. Cl. 106—18                                   8 Claims

ABSTRACT OF THE DISCLOSURE

The present invention relates to organic fireproofing compositions which have the ability to dry when applied as coatings or impregnants, and to withstand temperatures up to about 4000° F. for prolonged periods of time. Such compositions are provided by reacting vegetable oil pitches with an alkylol urea compound in the presence of a metal oxide catalyst.

Related applications

The present application is a continuation-in-part of applications Ser. No. 328,464, filed Dec. 6, 1963, now abandoned; Ser. No. 399,914, filed Sept. 20, 1964, now abandoned; and Ser. No. 397,024, filed Sept. 16, 1964, now abandoned.

Prior art

Organic flame resistance or retardant materials have long been used to reduce the inflammability of articles composed of combustible substances. Heretofore, stearin pitches have been proposed for such a purpose but have proved to be impractical at extreme temperatures, for example, above about 1500° F., because of the volatile substances present therein which tend to flare up. This characteristic of the stearin pitches not only limits the effectiveness of their fire retardancy but restricts the utility of the combustible materials which would otherwise find use in high temperature applications. A further disadvantage encountered in using stearin pitches is their inability to dry, even when dryers such as metallic soaps are added to promote such a result. Consequently, the stearin pitches are practically useless for coating or impregnating materials which require a non-tacky or dry surface.

Summary of the invention

The primary object of this invention is to provide an organic fireproofing composition which will dry to a non-tacky condition when applied as a coating or impregnant to combustible materials, and which will withstand extreme temperatures such as up to about 4000° F. for prolonged periods of time.

In accordance with the present invention organic fireproofing compositions are provided by reacting at least one vegetable oil pitch within the range of from about 10 to 50 weight percent, based on the weight of the vegetable oil pitch, of at least one alkylol urea compound of the general formula.

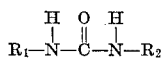

wherein $R_1$ and $R_2$ are selected from the group consisting of hydrogen and alkylols of from 1 to 3 carbon atoms, and at least one radical is an alkylol. The pitch and alkylol urea compound are reacted in the presence of from about 5 to 30 weight percent, based on the weight of the vegetable oil pitch, of a metal oxide catalyst selected from the group consisting of barium oxide, molybdenum oxide, antimony oxide and tungsten oxide.

In contrast to stearin pitches, it has been found that the above vegetable oil pitch derived fireproofing compositions, when applied as coatings to combustible materials, dry to non-tacky surfaces which will withstand temperatures up to about 2200° F. for about 25 minutes. When the composition is applied by impregnating the combustible material it will provide fireproofing properties up to about 4000° F. for about 45 minutes.

Detailed description

Illustrative of the vegetable oil pitches which may be used in the present invention are cottonseed oil pitch, corn oil pitch, soybean oil pitch, coconut oil pitch, and mixtures thereof. Cottonseed oil pitches are preferred because of their purity and high density which permits greater dilution with solvents and, therefore, more economical use.

The vegetable oil pitches are by-products of vegetable oil refining processes and consist essentially of esters of straight chain monobasic organic fatty acids. The esters may contain anywhere from about 15 to 25 carbon atoms, but normally contain from about 18 to 22 carbon atoms. Like stearin, the vegetable oil pitches are conventionally referred to as non-drying, primarily because of their high degree of saturation. Unlike stearin, however, when the vegetable oil pitches are reacted with an alkylol urea compound according to this invention a product is produced which will dry to a non-tacky condition. As hereafter more fully discussed, stearin when reacted with the urea compound under similar conditions will not form a non-tacky fireproofing coating capable of withstanding temperatures of about 2200° F.

The alkylol urea compounds used in this invention are of the general formula

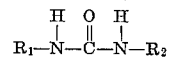

wherein $R_1$ and $R_2$ are selected from the group consisting of hydrogen and alkylols of from 1 to 3 carbon atoms, and wherein at least one radical, i.e., $R_1$ and $R_2$, is an alkylol. Illustrative of such akylol ureas are monomethylol urea, dimethylol urea, diethylol urea, monoethylol urea, monopropylol urea, and dipropylol urea. Preferably, dimethylol urea is used. In the range of from about 10 to 50 weight percent alkylol urea, based on the vegetable oil pitch, is reacted with the pitch to form the desired composition, and preferably from about 20 to 35 weight percent is used.

As previously mentioned, the metal oxide catalysts which may be used in the present invention are molybdenum oxide, barium oxide, antimony oxide and tungsten oxide, the preferred catalyst being barium oxide. The amount of catalyst used is in the range of from about 5 to 30 weight percent, and preferably 15 to 25, based on the weight of the pitch.

The reaction between the vegetable oil pitch and alkylol urea may be carried out at a temperature in the range of from 120° to 410° C., and preferably from about 140° to 250° C. Conveniently the above reaction is conducted at atmospheric pressure, however, higher or lower pressures may be used if so desired. Under the above temperature and pressure conditions a residence time of from about ½ to 6 hours, and preferably from about 1 to 3 hours, is required to form the desired fireproofing composition.

After completion of the reaction, the resulting product is washed and filtered in order to remove the metal oxide catalyst.

The pitch may be reacted with the alkylol urea in the presence of the catalyst in any conventional type of mixing zone, either on a batch, continuous or semi-continuous basis. Fireproofing compositions prepared as discussed above are inherently capable of drying to a non-tacky condition when they are applied as a coating and the coating is exposed to an oxygen-containing gas such as air for a period of time in the range of from about 5 to 10 hours. If a faster drying time or increased hardness is desired, in the range of from about 2 to 15 weight percent, based on the weight of the pitch and alkylol urea, of an organic peroxide may be added, and preferably from about 3 to 10 weight percent. The peroxides are normally added to the reaction mixture with the metal oxide catalyst, however, if desired they may be added during the reaction. Illustrative of such organic peroxides which may be used are the aliphatic diacetyl peroxide of lauric acid, 2,5-dimethyl-2,5-di(t-butyl peroxide) hexane, t-butyl hydroperoxide, and mixtures thereof.

In addition to the peroxides minor amounts, that is, from about 1 to 15 weight percent, based on the weight of the pitch and alkylol urea, of a metallic soap dryer may be added to the composition to aid in the drying of the resulting reaction product. The metallic soap dryers may be added before, during, or after the reaction. Suitable dryers are cobalt naphthenate, cobalt linoleate, and mixtures thereof. The metallic dryers may be used alone or in combination with the peroxide. It is important to realize that the invention does not reside in the particular drying agent, i.e., peroxide or metallic soap dryer, used. Any of the peroxides or metallic dryers which are commonly used by those skilled in the art may be employed.

The fireproofing composition may also contain varying amounts, e.g. 1 to 30 weight percent, but preferably not more than about 20 weight percent (based on the total weight of the composition), of conventional fillers such as asbestos, powdered mica, precipitated barium carbonate, titanium dioxide, and the like. Various commercial solvents, such as acetone and ethylene dichloride may also be added to adjust the viscosity of the resulting fireproofing composition.

In addition to applying the fireproofing composition as a coating, the material to be treated may also be impregnated with the composition in any convenient manner, e.g., by immersing the object in a bath of the composition for a period of time in the range of from about ¼ to 5 hours at a temperature in the range of from about 20 to 50° C. and at atmospheric pressure.

Example I

This example illustrates the preparation of and fireproofing properties of compositions of this invention. One hundred grams of cottonseed oil pitch were mixed with 30 grams of dimethylol urea in the presence of 20 grams of barium oxide and reacted at a temperature of 187° C. for a period of 45 minutes. Ten grams of cobalt linoleate were added under continuous stirring, followed by 10 grams of t-butyl hydroperoxide. The reaction was continued for an additional 30 minutes, and the reaction product cooled and filtered with water to remove the barium oxide catalyst. A hardwood board 2 inches long and 3 inches wide was coated with the resulting product and subjected to a flame test which consisted of subjecting the panel to the direct heat of a butane flame having a temperature of 2500° F. for a period of 10 minutes. No noticeable flame damage was observed.

Example II

The fireproofing composition prepared as in Example I was diluted with acetone to a 50 percent by weight solution. A hardwood board 2 inches long and 3 inches wide was impregnated with the solution and allowed to dry. The board was then subjected to the direct heat of an acetylene flame having a temperature of 4000° F. for a period of 10 minutes. No noticeable flame damage was observed.

The principle, preferred embodiment, and mode of operation of the present invention have been described in the foregoing specification. However, it should be understood that the invention which is intended to be protected herein may be practiced otherwise than as described without departing from appended claims.

I claim:
1. An organic fireproofing composition being formed by reacting:
  (a) at least one vegetable oil patch with
  (b) in the range of from about 10 to 50 weight percent, based on the weight of the vegetable oil pitch, of at least one alkylol urea compound of the general formula

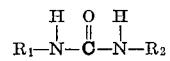

wherein $R_1$ and $R_2$ are selected from the group consisting of hydrogen and alkylols of from 1 to 3 carbon atoms, and at least one radical is an alkylol,
  (c) in the presence of from about 5 to 30 weight percent, based on the weight of the vegetable oil pitch, of a metal oxide catalyst selected from the group consisting of barium oxide, molybdenum oxide, antimony oxide and tungsten oxide, wherein the alkylol urea compound is reacted with the vegetable oil pitch in the presence of the catalyst at a temperature in the range of from about 120 to 420° C.

2. The composition as defined in claim 1 wherein the vegetable oil pitch is cottonseed oil pitch, the metal oxide catalyst is barium oxide, and the alkylol urea compound is dimethylol urea.

3. The compositions defined in claim 1 wherein the amount of alkylol urea compound is in the range of from about 20 to 35 weight percent and wherein the amount of catalyst used is in the range of from about 15 to 25 weight percent.

4. The composition as defined in claim 1 containing at least one drying agent selected from the class consisting of organic peroxides and metallic soap dryers.

5. An organic fireproofing composition, which is formed by reacting:
  (a) at least one vegetable oil pitch selected from the group consisting of cottonseed oil pitch, corn oil pitch, soybean oil pitch, and coconut oil pitch, with
  (b) from about 10 to 50 weight percent, based on the weight of the vegetable oil pitch, of at least one alkylol urea compound of the general formula

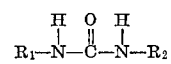

wherein $R_1$ and $R_2$ are selected from the group consisting of hydrogen and alkylols of from 1 to 3 carbon atoms, and at least one radical is an alkylol,
  (c) in the presence of from about 5 to 30 weight percent, based on the weight of the vegetable oil pitch, of a metal oxide catalyst selected from the group consisting of barium oxide, molybdenum oxide, antimony oxide and tungsten oxide, said reaction being being conducted at a temperature in the range of from about 120 to 410° C.

6. The composition as defined in claim 5 wherein the vegetable oil pitch is cottonseed oil pitch, the metal oxide catalyst is barium oxide, the alkylol urea compound is dimethylol urea, the amount of dimethylol urea is in the range of from about 20 to 35 weight percent, the amount of barium oxide catalysts is in the range of from about 15 to 25 weight percent, and the materials are reacted at a temperature in the range of from about 140 to 250° C.

7. The composition as defined in claim 6 containing at least one drying agent selected from the class consisting of organic peroxides and metallic soap dryers.

8. The composition as defined in claim 7 containing cobalt linoleate.

References Cited

UNITED STATES PATENTS 2,362,934  11/1944  Schlaanstine ---------- 260—23
2,944,921  7/1960  Harrison et al. ---  106—243 XR

OTHER REFERENCES

Abraham, H.: Asphalts and Allied Substances, chapter 1, "Compounding of Bituminous Substances," 6th ed., vol. 3, 1962, pp. 13 and 14 relied on.

JULIUS FROME, Primary Examiner

LORENZO B. HAYES, Assistant Examiner

U.S. Cl. X.R.

106—15, 243, 273; 117—137; 252—8.1